Figure 1:
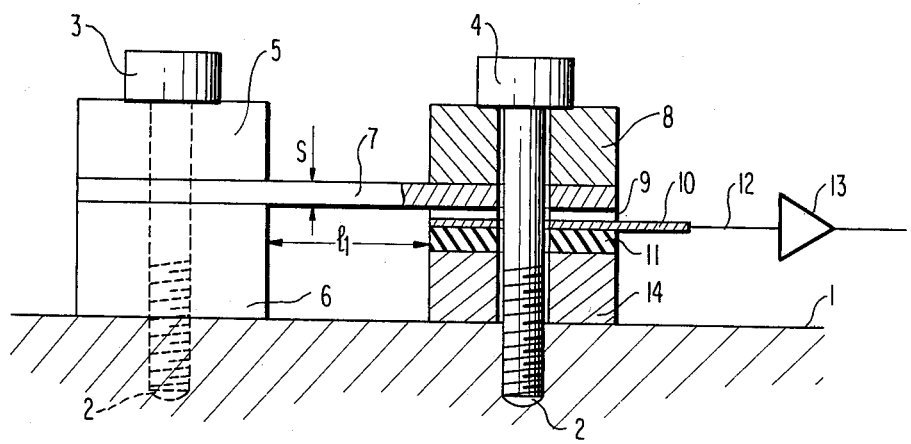

United States Patent [19]

Wolfer et al.

[11] 4,314,481
[45] Feb. 9, 1982

[54] PIEZOELECTRIC STRAIN TRANSDUCER

[75] Inventors: Peter Wolfer, Kleinandelfingen; Hans-Rudolf Derrer, Rheinau; Max Vollenweider, Winterthur; Hans-Conrad Sonderegger, Neftenbach, all of Switzerland

[73] Assignee: Kistler Instruments AG, Winterhur, Switzerland

[21] Appl. No.: 105,703

[22] Filed: Dec. 20, 1979

[30] Foreign Application Priority Data

Dec. 22, 1978 [DE] Fed. Rep. of Germany ....... 2855746

[51] Int. Cl.³ .......................... G01B 7/16; G01L 1/16
[52] U.S. Cl. ...................................... 73/774; 73/781; 310/333
[58] Field of Search ................ 73/763, 774, 777, 781; 310/333

[56] References Cited

U.S. PATENT DOCUMENTS 3,545,283 12/1970 McGwnigle ........................ 310/333
3,614,488 10/1971 Sonderegger et al. ............... 73/774

Primary Examiner—James J. Gill
Attorney, Agent, or Firm—Craig and Antonelli

[57] ABSTRACT

A piezoelectric strain/force transducer is described, which is attached preferably by only one locking screw to a test specimen or machine part. The force transmitting member of the transducer comprises two bearing surfaces at a distance apart, which bear frictionally on the surface of the machine part and experience a change in spacing in the case of a change in length of the machine part. Due to this, a resilient member, which can be adapted to a desired sensitivity of the gauge, is tensioned and a set of piezoelectric plates held under precompression in the force-transmitting member are subjected to a corresponding shearing force. The piezoelectric plates are cut or polarized so that they respond piezoelectrically solely to shearing forces. The resulting piezoelectric charge is a measurement of the strain or mechanical stress of the machine part and can be used for monitoring or controlling machines or components, in particular those which are subjected to cyclic loads.

17 Claims, 7 Drawing Figures

PIEZOELECTRIC STRAIN TRANSDUCER

The invention relates to a piezoelectric strain gauge or transducer for determining the elongation of a measuring section on the surface of a test specimen and/or of a force acting on the test specimen.

Each component which has to transmit forces is stressed by the latter and undergoes a deformation. Thus, according to Hooke's law, the strain of a material is proportional to the stress. This relationship can be verified most simply in the case of tie-rods, where a simple uniaxial state of stress prevails, in that the strain is measured in the direction of the force. However, tensile stress and compressive stress can overlap in three spatial directions with shearing stresses about three different axes. Each tensile or compressive stress thus brings about deformation at right angles to the direction of the force (Poisson effect) and in the case of workpieces having a complicated construction, the distribution of stress overall is so inhomogeneous and complicated that it can scarcely be calculated. Therefore, for a long time, it has been attempted to measure the deformations directly by means of strain gauges.

Thus, originally, determining the material stress was the main point of interest. In the case of the present strain gauge, this aim is not of prime importance, but rather the determination of forces acting in a machine or a component. However complicated the stress fields may be in a machine part, the strain measured at any point is proportional to the force acting at another point. Thus, it is not necessary to measure the strain at a point subject to considerable stress. Frequently, these very points are inaccessible, are moving or subjected to unfavourable environmental conditions. It is a special characteristic of the piezoelectric strain gauge described in this case, that it has great sensitivity and thus very slight strains in a machine frame or foundation can be measured. The relationship between the strain measured and the acting force can be determined easily by a calibration by means of a reference member for measuring forces.

For permanent monitoring, in particular for protection against overloading, strain gauges were developed which are attached by means of screws to the surface of the test specimen. In known constructions, such as for example according to German Offenlegungsschrift 26 17 987, the strain gauge is attached by several screws to the test specimen, so that in the case of an elongation of the test specimen, the length of the base section or measuring section between the tapped holes for the screws is increased in a corresponding manner. This drawing-apart of the screws is transmitted to an S-shaped spring member, which is connected to the two screw guides. Attached to the spring member are wire strain gauges, which change their resistance value in the case of an elongation. The elongation of the test specimen is thus transmitted to the wire strain gauge in a somewhat complicated manner, in which case instead of the wire strain gauge being stuck directly to the test specimen, the latter is connected by screws, which connection is more durable than an adhesive connection, but requires close tolerances with regard to the spacing between holes, vertical alignment of the axes of the holes and flatness of the support. Furthermore, the sensitivity of wire strain gauges in comparison with piezoelectric strain gauges for example, is low. A wire strain gauge which is stuck to a support, which experiences an elongation of 1 $\mu$m, solely emits a useful signal of approximately $10^{-5}$ volts, whereas a conventional X-cut quartz plate having a surface area of 1cm$^2$ and a thickness of 1 mm supplies a useful signal of approximately 4.42 volts under the same conditions. Piezoelectric strain gauges are thus inherently more sensitive by several orders of magnitude than gauges based on wire strain gauges.

Piezoelectric strain gauges are known. A known gauge of this type is described in German Offenlegungsschrift 26 34 385. As in the afore-described wire strain gauges, two tapped holes must be provided in the surface of the test specimen, at the ends of a base section. The two screws are screwed into these holes. A piezoelectric transducer element with piezoceramic material, which is sensitive to compressive force, is clamped between the specially shaped screw heads. An elongation or compression of the test specimen brings about a reduction or increase in the clamping stress, which produces an electrical voltage or an electrical charge at the piezoelectric transducer element. One drawback of this strain gauge is its difficult mounting and adjustment. The clamped length of the transducer member between the screw heads must be adjusted so that the correct pre-tension exists. In this case, the screws act as bending springs and since the length by which screws are screwed into the tapped holes is not defined exactly, good linearity cannot be expected. In this respect, this is not of great importance, since the piezoelectric effect of the normal piezoceramics, which are used for the known transducer member, is anyhow not linear and also has great hysteresis. Furthermore, this piezoelectric effect is greatly dependent on temperature and displays a constant reduction over relatively long periods of time. In the case of rapid temperature changes in the environment, the high pyro effect of piezoceramics may lead to an overload of the follow-up amplifier as a result of the high pyro voltage at the input. Another drawback of the known piezoelectric strain gauge is that monitoring of the measured values takes place using the piezoelectric longitudinal effect and therefore, as will be described in detail hereafter, superimposed bending moments and the like may have the effect of directly adulterating the measured values.

Finally, German Patentschrift 674 841 describes a piezoelectric force pickup for measuring the displacement of two parts which are able to move relative to each other, in which a set of piezoelectric plates is held under pre-tension between two resilient diaphragms clamped in a housing, so that the force acting on the piezoelectric plates is determined by the rigidity of the diaphragms. Therefore, the gauge can be adjusted to a desired sensitivity by an appropriate choice of the rigidity. However, it is a drawback that known gauges are only able to determine compressive forces and the piezoelectric plates used conventionally are likewise so called X-cut plates, in which the piezoelectric longitudinal effect is used.

In contrast to the latter, it is the object of the invention to provide a piezoelectric strain gauge of the aforementioned type, which with a simple and robust construction and high sensitivity of response, is not influenced, or only slightly, as regards the monitoring of measured values, by interference effects, such as temperature fluctuations, superimposed bending forces, inhibited transverse elongation and the like.

Unlike the piezoelectric strain gauges known hitherto, the invention provides one or more piezoelectric elements or plates, which react piezoelectrically solely to a shear force in a certain direction and are held under pre-tension (pre-compression) in a force-transmitting member which can be frictionally connected to the test specimen so that a change in the length of the test specimen manifests itself in a shearing force acting on the piezoelectric plates. Thus, the force-transmitting member comprises one or more resilient intermediate members or partial regions, which take part in introducing or transmitting the shearing force and facilitate easy adjustment of the sensitivity of the strain gauge by selecting an appropriate elasticity. On account of the good linearity and of the absent pyro effect, a quartz crystal with a so-called Y-cut is provided as the piezo material for the piezoelectric plates, but piezoceramic material may also be used, which is polarised so that the latter responds solely to shearing stress.

Basically, the strain gauge according to the invention may be attached to the test specimen by means of 1, 2 or more screws. However, a particularly advantageous and presently preferred development or embodiment of the invention is characterised by the fact that only a single locking screw is provided for the frictional connection of the transmitting member. In addition to easier assembly and dismantling, piezoelectric strain gauges of this type comprising a single screw also provide the possibility of being able to adjust the strain gauge on the spot to the conditions of maximum stress of the test specimen, when the maximum path of lines of force in the test specimen is not known exactly. In this case, it is possible to undertake a gradual calibration directly on the processing machine to be monitored, in comparison with a force measuring member in the flow of force through the machine, and the strain gauge may then be rotated progressively in an angular manner until a maximum measured value is indicated for a known machine load.

The combination according to the invention of piezoelectric plates responding substantially solely to shearing forces and adjustable resilient intermediate members or partial regions (which bear the reference numerals 7, 22, 33, 59, 64, 60 in the drawings) thus represents substantial progress in the field of monitoring the operation of processing machines, in particular those with cyclic operations.

To summarise, the invention provides a piezoelectric strain gauge, which is preferably attached by means of a single locking screw to the surface of a machine part stressed by forces and which with two locating surfaces bears frictionally on the ends of a measuring or base section of the machine part. An elongation in the surface of the machine part causes an extension of the measuring section and a displacement of the bearing surfaces, due to which a resilient intermediate member or a resilient partial region on the force-transmitting member of the strain gauge is tensioned and a shearing force acts on a set of shear-sensitive piezoelectric plates. The resulting piezoelectric charge is a measurement of the elongation of the machine part and thus of the force acting on the selected point of the machine.

Figure 2:
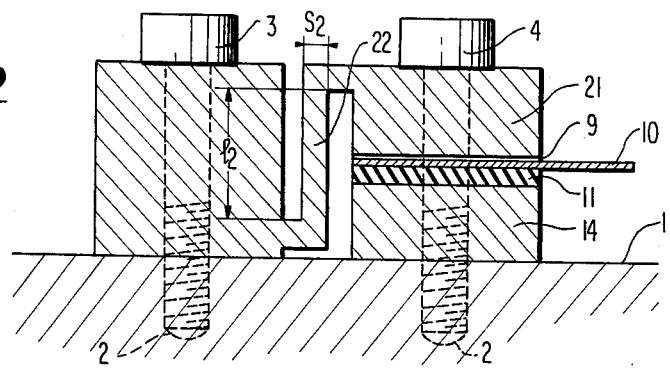
Figure 3:
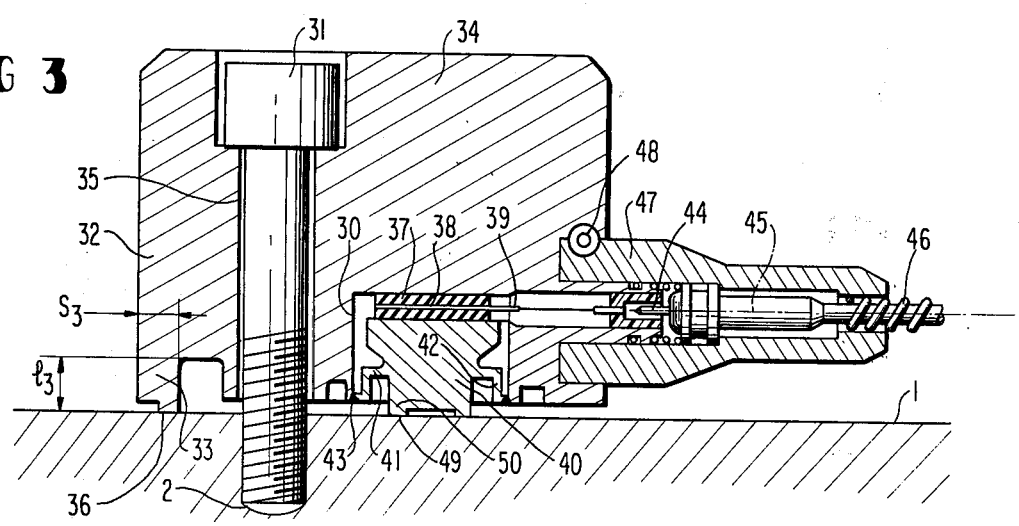
Figure 4:
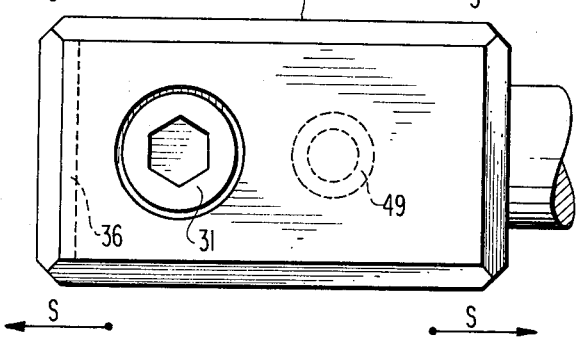
Figure 5:
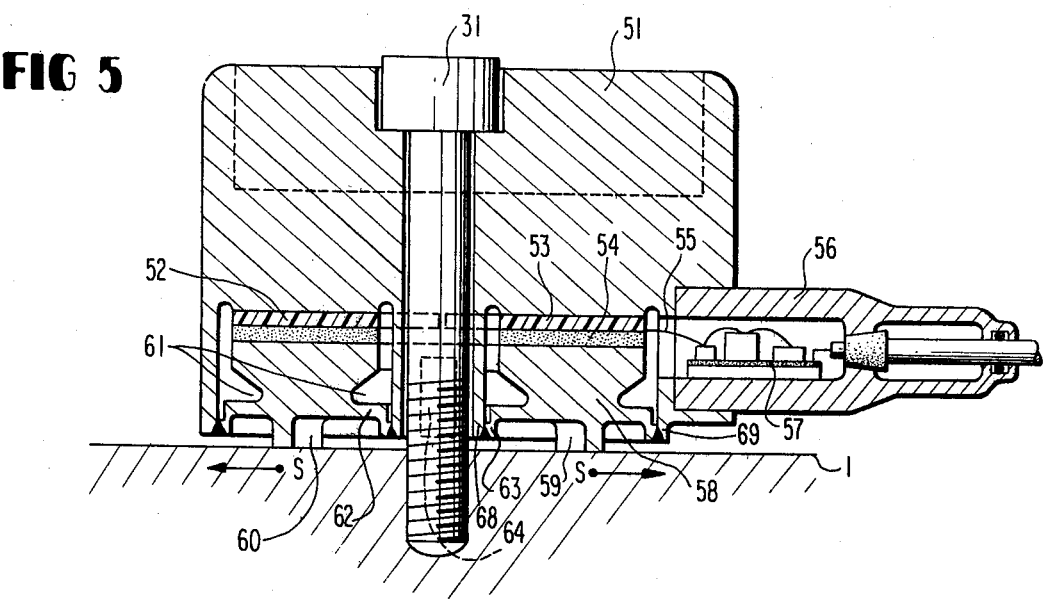
Figure 6:
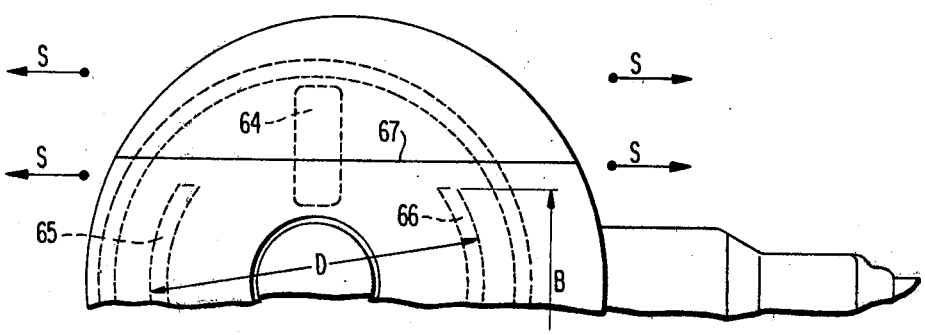
Figure 7:
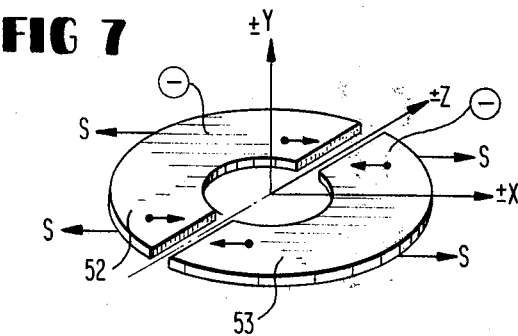

Embodiments of the invention are described in detail hereafter with reference to the drawings:

FIG. 1 is a diagramatic view partly in section of a first embodiment of a piezoelectric strain gauge constructed according to the invention, with two screws for its connection to the test specimen and a resilient member constructed as a tie-plate, FIG. 2 is a diagrammatic view partly in section of a second embodiment of a piezoelectric strain gauge constructed according to the invention, with two screws and with a resilient member constructed as a bending spring, FIG. 3 is a sectional view of a third preferred embodiment of a piezoelectric strain gauge constructed according to the invention, with only one screw for its connection to the test specimen, FIG. 4 is a plan view of the embodiment according to FIG. 3, FIG. 5 is a longitudinal sectional view of a fourth preferred embodiment of a strain gauge constructed according to the invention with only one screw for its connection to the test specimen, FIG. 6 is a plan view of the embodiment according to FIG. 5, and FIG. 7 is a perspective detailed view of the piezoelectric plates in the form of half a ring, which are preferably used in the embodiment according to FIG. 5.

In the drawings, identical or similar parts are provided throughout with the same reference numerals.

In FIG. 1, the reference numeral 1 designates the surface of a test specimen, for example of a part or section of a machine or apparatus, which is subjected to a load and in which, at a suitable point, two tapped holes 2 are provided at a distance apart for screwing in a securing screw 3 and a locking screw 4. In the embodiment of the invention according to FIG. 1, the force-transmitting member consists of two block arrangements located at a distance apart, which are interconnected by way of a tie-plate 7 representing the resilient member. The left-hand block arrangement in the drawing comprises two washers 5, 6, between which one adjacent end region of the tie-plate 7 is clamped by means of the securing screw 3 extending through the said parts. The other right-hand block arrangement in the drawing comprises an upper cover plate 8 and a lower shear plate 14 resting on the surface 1 of the test specimen, which enclose there between, in succession starting from the top, the other end region of the tie-plate 7, an insulating plate 9, an electrode 10 and a piezoelectric plate 11, these parts being pressed together with pre-tensioning of the piezoelectric plate 11, by the locking screw 4 extending there through.

In the case of the strain gauge or transducer attached to the test specimen by means of screws 3, 4, an elongation of the test specimen has the effect that the distance between the tapped holes 2 is increased and the tie-plate 7 is subjected to tensile stress. On account of the arrangement selected, the force prevailing in the tie-plate 7 acts on the piezoelectric plate 11 with a shearing force. The piezoelectric plate 11 is designed according to the invention so that as regards the forces acting thereon, it responds piezoelectrically solely under shear. If the plate 11 is a piezoelectrical crystal, such as quartz, then this is achieved by providing a so-called Y-cut, in which the surfaces of the piezoelectric plate 11 are directed at right angles to the crystallographic Y-axis. On the other hand, if a piezoceramic element is used for the plate 11, in place of a piezoelectric crystal, the direction of electrical polarisation must lie in the plane of the plate and must be parallel to the measuring section, which once more produces an element stressed in shear. When assembling the strain gauge according to FIG. 1, the piezoelectric plate 11 is aligned so that the tensile force of the tie-plate 7 acts in the direction of the crystallographic X-axis. The electrode 10 is connected to an amplifier 13 by a cable 12.

The advantage of the use of the piezoelectric shear effect is clear, if one considers the matrix of the piezoelectric constants of a quartz crystal as a typical example. Matrix of piezoelectric constants of quartz:

| $d_{11}$ | $-d_{11}$ | 0 | $d_{14}$ | 0 | 0 |
| 0 | 0 | 0 | 0 | $-d_{14}$ | $-2d_{11}$ |
| 0 | 0 | 0 | 0 | 0 | 0 | or in numbers respectively $10^{-12}$ C/N

| 2,31 | $-2,31$ | 0 | $-0,727$ | 0 | 0 |
| 0 | 0 | 0 | 0 | 0,727 | $-4,62$ |
| 0 | 0 | 0 | 0 | 0 | 0 |

Piezoelectric gauges of known construction, which operate with quartz crystals, use so-called X-cut plates utilising the longitudinal piezoelectric effect $d_{11}$. This means that the plates are loaded at right angles to the surface and charges are produced on both surfaces of the plate.

It is apparent from the above matrix that charges occur on the plate surfaces of an X-plate due to the transverse effect, i.e. when the plate is pressed radially from the side in the direction of the Y-axis, high charges likewise occur, which may manifest themselves as a fault signal. In the case of vertical pressure on the plate, on account of the so-called Poisson effect, the tendency of the material is to shift sideways, but which is partly suppressed by the adjoining electrodes. As a result of this suppression, radial forces are produced, which via the transverse effect, produce piezoelectric charges, which partly compensate for the charges produced by the longitudinal effect. Accordingly, the charges existing as a whole, are dependent on the degree of suppression of the transverse elongation. Thus, a force does not produce the same piezoelectric charge, if the latter acts at the centre or at the edge of the plate. At the centre, the degree of suppression is greater, since the loaded areas of the plates are surrounded by unloaded areas, which prevent transverse elongation. On the otherhand, at the edge regions of the plate, transverse elongation may occur unhindered at least in one direction. Furthermore, if a bending moment for example about the Z-axis acts on the surface of an X-cut plate, then actually no piezoelectric charge should occur on the plate, since the pair of forces produces a positive charge on one side of the plate and a negative charge on the other side, so that the charges cancel each other out. However, if the plate is subjected to a pre-tensioning force, which passes through the centre of the plate, the action of a bending moment implies a shift of this force in the direction of the Y-axis towards the edge of the plate, where the inhibition of the transverse elongation is less and the piezoelectric effect is greater. The force then produces a greater piezoelectric charge, which is apparently the effect of the moment.

It is also apparent from the above matrix that a shearing effect $d_{14}$ exists, which may like-wise produce a charge on the X-cut surface. However, since the compression in the X-direction does not involve an angular deformation in a manner similar to the transverse elongation as a result of Poisson's effect, there is no suppression of the deformation and a secondary action of the shearing effect does not occur.

A Y-cut plate therefore reacts solely to shear in the X-direction, so that secondary interference effects as a result of Poisson's transverse elongation as well as transverse piezoelectricity do not occur. The second shearing effect $-d_{14}$ like-wise does not interfere. The piezoelectric sensitivity of such a plate is thus not influenced by pre-tensioning moments in the strain gauge, which may vary in the case of elongation of the support. On the contrary, the plate reacts solely to the acting shearing force, which implies an essential advantage, since attaching the strain gauge so that it is free from deflection is virtually impossible. This advantage of the piezoelectric shearing effect with respect to the transverse and longitudinal effect exits in most piezoelectric materials, i.e. not solely in quartz.

Depending on whether the cross-section $S_1$ of the tie-plate 7 is chosen to be greater or smaller or whether the free bridging length $l_1$ of the tie-plate 7 between the two block arrangements in FIG. 1 is shorter or longer, in the case of a pre-determined elongation of the test specimen, a greater or lesser force is transmitted to the piezoelectric plate 11 and the output signal of the latter is thus correspondingly greater or smaller. Therefore, by changing the cross-section $S_1$ or the length $l_1$, the sensitivity of the strain gauge according to FIG. 1 may be adjusted easily. However, the tie-plate 7 should not be so rigid that excessively high forces occur, which could lead to slipping of the strain gauge on the surface of the test specimen.

A further embodiment of the invention is illustrated in FIG. 2. The strain gauge illustrated in the latter is particularly suitable for larger measuring ranges, for example when the test specimen consists of a material other than an iron alloy. For this it has lower sensitivity.

In FIG. 2, the reference numeral 1 once more designates the surface of the test specimen, 2 designates a pair of tapped holes at a distance apart, 3 a securing screw and 4 a locking screw. The force-transmitting member 21 is like-wise basically composed of two block arrangements located at a distance apart, of which one, namely the left-hand arrangement in the drawing, is pressed against the surface of the test specimen by means of the securing screw 3 and the other arrangement, namely the right-hand arrangement in the drawing, is pressed against the surface of the test specimen by means of the locking screw 4. However, the two block arrangements are preferably interconnected in an integral manner in a manner differing from FIG. 1, by way of a spring member 22 in the form of a bending spring, representing the resilient member of this embodiment. The bending resistance of the spring member 22 can be varied within wide limits by an appropriate choice of length $l_2$ and of the cross-section $S_2$. By subsequent machining of the spring member 22, if necessary even when assembled, an adjustment of the sensitivity of the strain gauge to a pre-determined desired value is quite possible. As in the afore-described embodiment, in the right-hand block arrangement, the insulating plate 9, the electrode 10 and the piezoelectric Y-cut plate 11 are clamped by the locking screw 4 between a section of the force-transmitting member 21 and a shear plate 14 resting on the surface of the test specimen.

The embodiments of the invention according to FIGS. 1 and 2 require two screws 3, 4 for the frictional connection of the strain gauge to the test specimen. The screws thus fulfil a double function, in that they serve not only for attaching the strain gauge to the surface of the test specimen, but they also take part in transmitting the change in length of the measuring or base section of the test specimen. The arrangement using two screws involves not only a considerably greater amount of time for assembly and dismantling of the strain gauge, but may also lead to difficulties if the direction of the forces acting on the test specimen is not known exactly hitherto. These problems are obviated with the preferred arrangement of the invention according to FIGS. 3 and 5, using one screw.

In FIG. 3 the reference numeral 1 once more designates the surface of the test specimen subjected to an elongation and the reference numeral 2 designates a single tapped hole in the surface of the test specimen, into which a locking screw 31 can be screwed for securing the strain gauge. The strain gauge according to FIG. 3 comprises a force-transmitting member 32, which comprises a resilient partial region 33 at one end and a bridge part 34 in the region of its other end.

Furthermore, as illustrated, a hole 35 is provided in the force-transmission member, through which hole the clamping screw 31 extends. The resilient partial region 33 of the force-transmitting member, which in this case is constructed in the form of a strip which is not necessarily attached in an integral manner, extends in the direction of the surface 1 of the test specimen and is located at right angles with respect to the longitudinal axis or reference surface 67 of the strain gauge or transducer, comprises a straight bearing surface 36 resting on the surface 1 of the test specimen (FIG. 4), which is pressed against the surface of the test specimen by the pre-tensioning force of the locking screw 31 and represents one of the two devices by which the strain gauge is connected frictionally to the surface of the test specimen. As illustrated, located in the region of the other end of the force-transmission member 32, in the direction of the measuring section, specifically in the bridge part 34, is an aperture 30, which receives a shear plate 40. Two piezoelectric plates 37, 38 located one above the other, with an elecrode 39 arranged therebetween, are held under pretension between the surface of the shear plate 40 remote from the surface of the test specimen and the opposing surface of the aperture 30 in the bridge part 34. The electrodes 39 and a plug socket 44 attached to the strain gauge in a suitable manner are connected electrically to each other. As illustrated, the shear plate 40 comprises a substantially horizontal annular cover plate 41 and a covering sleeve 42 extending downwards from the outer end of the annular cover plate, which sleeve 42 is attached by a welded joint 43 to adjacent points of the aperture 30 in the bridge part 34. The shear plate 40, the annular cover plate 41 and the covering sleeve 42 preferably represent integral parts and are turned from one piece. They cover the piezoelectric plates 37 and 38 on the underside and thus protect the latter against the penetration of dust and moisture. Furthermore, the shear plates 40, the piezoelectric plates 37, 38 and the electrode 39 are held against the bridge part 34 by the annular cover plate 41 and the covering sleeve 42 as a result of their elasticity. However, the annular cover plate 41 and the covering sleeve 42 have sufficient elasticity so that lateral displacements of the shear plate 40 are possible without substantial hindrance. The said pre-tensioning effect produced by the parts 41, 42 is increased further by the pre-tensioning force of the locking screw 31. The reference numeral 45 designates a plug, which, as illustrated, engages in a plug socket 44, which is attached to a highly insulated, noise-free, screened cable 46. A sleeve 47 serves for attaching the cable 46 to the force-transmitting member 32 and a locking pin 48 wedges the sleeve 47 in the transmitting member 32.

The cable 46 conducts the charges taken from the piezoelectric plates 37 and 38 by means of the electrode 39, to an external charge amplifier (not shown).

According to the invention, on its side facing the surface 1 of the test specimen, the shear plate 40 comprises an annular web 50 with an annular bearing surface 49 (FIG. 4), which rests on the surface of the test specimen. The annular shape of the bearing surface 49 was chosen in order to obtain the most uniform possible distribution of load on the piezoelectric plates 37 and 38, in which case the height of the annular web 50 is such that the bearing surface 49 may adapt itself elastically without slipping to the elongation of the clamped surface area of the test specimen. The end of the measuring section is than a virtual point, which is located approximately at the centre of the surface area of the test specimen surrounded by the annular web 50. Inter alia, the annular introduction of force to the shear plate 40 has the advantage that in the case of slightly convex or concave test specimen surfaces, the distribution of stress or load to the piezoelectric plates 37 and 38 changes only slightly, whereas when providing a bearing surface having a circular surface for example, the introduction of force would take place at a point in the centre or at the edge and the resulting varying distributions of stress could lead to varying sensitivity of the strain gauge.

Another essential advantage of the annular bearing surface 49 consists in that the shear plate 40 is only able to move laterally, but cannot tip, since due to the laminar extent of the support, the shear plate 40 is forced to retain the horizontal or surface-parallel position. On the otherhand, an edge as the bearing surface would facilitate a rotation about the bearing edge, so that the shear plate 40 would transmit a bending moment to the piezoelectric plates 37 and 38, which would be deformed quite considerably by the latter. Stated in simplified terms, the shear plate 40 represented a lever and on account of their low modulus of elasticity and the elasticity of the gap, the piezoelectric plates 37 and 38 represented a joint. An arrangement of this type would have the function of a transverse beam with a low elasticity constant and accordingly the force transmitted and the sensitivity would be low.

This bending elasticity is greatly reduced by the surface guidance. Furthermore, on the one hand, the annular web 50 must have a certain stability, in order to be able to transmit small moments and on the otherhand a flexibility such that the bearing surface 49 on the annular web 50 is able to adapt to the surface 1 of the test specimen.

Optimum conditions are provided when the two bearing surfaces 36, 49 press on the surface of the test specimen with a surface pressure of $2 \times 10^8$ to $3 \times 10^8$ N/m$^2$. The surface of the test specimen is not damaged by this pressure and furthermore, the strain gauge can be fitted and dismantled as often as necessary. In the case of known strain gauges with cutting edges or prongs, which engage in the surface of the test specimen, dismantling and fitting cause difficulties, if the original sensitivity is to be reproduced.

Since the locking screw 31 is located substantially at the centre of the measuring section, at the time of an elongation of the test specimen, the clamping screw is not subject to any displacement with respect to the latter or the tapped hole 2. Although it represents a third frictional connection, the locking screw 31 therefore does not exert a disturbing effect. In addition, the locking screw 31 bears by its head on the bridge part 34 of the transmitting member 32 and the shaft of the screw has sufficient clearance in the hole 35. The locking screw 31, considered as a transverse beam, is relatively long, in which case the elasticity constant of the screw is low in comparison with the other elasticity constants. A possible residual displacement due to poorly adjusted elasticities—to the left and right—leads solely to negligibly small errors. Since the resilient partial region 33 of the force-transmitting member has a small cross sectional area, the bearing surface 36 should not be curved, but should be straight. Furthermore, in particular, an annular shape of the bearing surface 36 is not necessary, since at this point there is no direct action on the piezoelectric plates.

As shown in FIG. 3, according to the invention, the bearing surface 36 is offset towards the centre of the measuring section or strain gauge, with respect to the central axis of the resilient region 33. Due to this eccentric introduction of force and as a result of the pre-tensioning force of the screw 31, the elastic region 33 experiences a moment in counterclockwise direction. This moment would result in bending of the region 33 and a movement of the bearing surface 36 towards the centre of the measuring section. However, this displacement does not come into effect, since a second moment in the clockwise direction, likewise caused by the pre-tensioning force of the screw 31, acts on the bridge part 34 and bends the latter slightly. This bending tends to move the bearing surface 36 in the reverse direction, as discussed previously. Therefore, the elasticities of the resilient region 33 and of the bridge part 34 may be adjusted to each other so that the two movements of the bearing surface 36 as a result of the bending of the parts 33 and 34 compensate each other mutually or are independent of the extent to which the screw 31 was tightened. This independence from the pretensioning of the screws provides two advantages:

1. If upon elongation of the test specimen 1, bending should likewise occur, which changes the pre-tension of the screws, this has no effect on the measuring result.
2. If the compensation did not exist, when the screw 31 is tightened, pre-tensioning of the piezoelectric plates 37 and 38 or a shift of the 0-point from the centre of the working region would occur. This causes a restriction of the measuring range, if it is intended to measure oscillations with the same high positive and negative amplitudes. The latter is generally the case.

An elongation of the surface 1 of the test specimen causes an extension of the distance between the bearing surfaces 36 and 49. This extension leads to bending of the resilient partial region or member 33, but the bridge part 34 and the shear plate 40 also undergoing slight bending. Super-imposed on the bending is shearing deformation of the resilient partial region 33, of the bridge part 34, of the piezoelectric plates 37 and 38 and of the shear plate 40. The sensitivity of the strain gauge can be adjusted by suitable dimensioning of the thickness $S_3$ and of the length $l_3$ of the resilient partial region 33. In this case it should be noted that not only does the strain gauge itself experience a deformation due to the deformation of the surface of the test specimen, but that it also exerts forces on the surface of the test specimen and consequently causes secondary deformations in the reverse direction to the primary elongation of the surface. An adjustment or calibration of the strains gauge is therefore solely suitable for the same support material.

FIG. 5 shows a further preferred embodiment of a strain gauge according to the invention. In this embodiment, two piezoelectric plates 52 and 53 in the form of half a ring and a shear ring 58 with attached support webs 59 and 60 are arranged concentrically about the locking screw 31. In a manner similar to the embodiment according to FIG. 3, the shear ring 58 is provided on its inner and outer peripheral regions with perforations or recesses 61, which respectively form an inner or outer annular cover plate 62, which are under axial pre-tension. Extending downwards from each annular cover plate 62, as shown, is a covering sleeve 63. As illustrated, the shear ring is received in a space between two resilient housing parts 68, 69, located at a distance apart, which extend from the housing block 51 downwards in the direction of the surface 1 of the test specimen into the vicinity of the respective lower end of the covering sleeves 63. Each covering sleeve 63 is connected at its lower end to the respective housing part 68, 69, for example by a welded seam.

Furthermore, according to FIGS. 5 and 6, the shear ring 58 is provided with a slot 64 of predetermined depth, in order to reduce or adjust the passage of forces, i.e. the direct transmission of forces between the webs 59 and 60. The slot 64 extends through the centre point of the shear ring at right angles to the measuring section.

Instead of the charge signal being supplied direct according to FIG. 3, then preferably according to FIG. 5, a miniature amplifier 57 may be located either in the housing block 51 or in a sleeve 56 attached thereto. This provides the advantage of a signal output with low impedance, which is not sensitive to insulation losses and interference effects. Miniature amplifiers of this type and similar amplifiers are described for example in Swiss Patent Specification 54 243. It will be understood that instead of providing an integrated miniature amplifier 57, a separate amplifier with the arrangement for the division of the charge according to FIG. 3 and vice versa can be used.

FIG. 6 shows the strain gauge according to FIG. 5 in plan view. For an optimum support and transmission of the shearing forces S to the piezoelectric plates 52 and 53, suitable dimensioning of the length B and of the diameter D of the bearing surfaces 65 and 66 located on the resilient webs 59, 60 is of significance. Therefore, in the present embodiment, the resilient behaviour is determined by the elasticity of the residual cross-section of the shear ring remaining due to the slot 64 and of the webs 59 and 60 curved in the form of part of a circle.

As mentioned, in the embodiment according to FIGS. 5 and 6, the piezoelectric plates 52 and 53 are preferably constructed in the form of two discs in the shape of half a ring. The arrangement of these piezoelectric plates 52 and 53 with the corresponding crystal axes X Y Z is shown in detail in FIG. 7. When introducing shearing forces S(FIG. 5) by way of the webs 59 and 60, the shear ring 58, the insulation plate 54 and the electrode 55 to the piezoelectric plates 52 and 53, in order that solely charges of the same polarity occur on one side, pairing of the piezoelectric plates must take place so that the crystallographic X-axis of the plate 53 extends in the opposite direction to the crystallographic X-axis of the plate 52. When assembling the strain gauge, it will be understood that as regards their axes, the piezoelectric plates 52 and 53 must be arranged to correspond to the strain gauge reference surfaces 67 illustrated in FIG. 6 (only one is shown). Furthermore, reference should be made to the description of the embodiment according to FIG. 3, as regards further constructional features.

Unlike the embodiments according to FIGS. 1 and 2, the embodiments of the strain gauge with only a single locking screw 31, according to FIGS. 3 and 5, have the advantage that this strain gauge can be easily adjusted to the maximum conditions of stress or elongation, if the direction of the field of stress S in the test specimen is not known exactly, in that after each calibration operation, the strain gauge reference surfaces 67 are rotated through a pre-determined angle with respect to the surface of the test specimen, until a maximum signal is emitted. Therefore, the constructions according to FIGS. 3 and 5 comprising a single screw offer essential advantages of application in contrast to the constructions according to FIGS. 1 and 2 comprising two or more screws.

In all the afore-described embodiments of the invention, conventional indicating apparatus for threshold or maximum values with connected switching relays can be used according to the application of the monitoring installation. In order to obtain an exact indication of the measured value, which can be repeated, the entire measuring chain is advantageously calibrated in situ. Thus, for example in a monitoring installation for presses, a reference force-measuring member is placed below the press ram, whereupon the calibration can be undertaken gradually.

I claim:

1. Piezoelectric strain transducer for determining the elongation of a measuring section on the surface of a test specimen under cyclic compressive or tensile load, the transducer comprising two spaced bearing surfaces for frictionally engaging the measuring surface section of the test specimen, at least one of the bearing surfaces being connected to at least one adjustable resilient member and at least the other bearing surface being connected to a support member of the transducer forming a support surface for at least one piezoelectric plate means, the piezoelectric plate means being under pre-compression and arranged for responding solely to shearing forces, a force-transmitting member of the transducer extending from the resilient member to the piezoelectric plate means for bearing upon the upper surface of the piezoelectric plate means, a single screw extending through the transducer between the bearing surfaces for frictionally connecting the transducer to the measuring section, whereby upon a change in length of the measuring section, substantially only a shearing force acts on the piezoelectric plate means corresponding to the strain in the measuring surface section and resulting in the emission of corresponding electric signals from the transducer.

2. Strain transducer according to claim 1, characterized in that the one bearing surface connected to the resilient member is straight and the other bearing surface located in the region of the piezoelectric plate, is constructed in an annular manner.

3. Strain transducer according to claim 2, characterized in that the one bearing surface is narrower than the resilient member and is offset eccentrically with respect to the latter in the direction of the centre of the measuring section.

4. Strain transducer according to claim 1, 2 or 3, characterized in that the support member includes a shear plate supporting the piezoelectric plate with respect to the transmitting member, which shear plate is connected in a shear-resilient manner to the transmitting member by way of an annular cover plate and a covering sleeve and which pre-compresses the piezoelectric plate as well as covers the latter on the outside.

5. Strain transducer according to claim 1, characterized in that both bearing surfaces are constructed in the shape of part of a circle.

6. Strain transducer according to claim 1 or 5, characterized by a shear ring comprising the at least one resilient member and the two bearing surfaces and located in a housing block, the shear ring, the bearing surfaces and the piezoelectric plate means located between the shear ring and housing block, are located concentrically with respect to the single screw.

7. Strain transducer according to claim 6, characterized in that the shear ring comprises slots, which relative to the longitudinal axis of the single screw form longitudinally resilient annular cover plates and transversely resilient covering sleeves, the latter being connected in a tight manner to adjacent tubular concentric regions of the housing block.

8. Strain transducer according to claim 6, characterized in that the shear ring comprises a slot for the adaptation of the resilient passage of force.

9. Strain transducer according to claim 1, characterized in that the bearing pressure of the bearing surfaces amounts to $2 \times 10^8 - 3 \times 10^8$ N/m$^2$ and can be adjusted.

10. Strain transducer according to claim 1, characterized in that its measuring sensitivity can be adjusted by varying the constant of elasticity of the respective resilient member.

11. Strain transducer according to claim 1, characterized in that the piezoelectric plate means consists of a single quartz crystal.

12. Strain transducer according to claims 1, 2, 3, 9, 10, or 11, characterized in that the piezoelectric plate means is a full quartz disc cut with a Y-cut.

13. Strain transducer according to claim 1, characterized in that the piezoelectric plate means with a Y-cut is formed from two annular segments, which are arranged so that only plate surfaces having the same polarity bear against an electrode (55).

14. Strain transducer according to claim 1, characterized in that the crystallographic X-axis of the piezoelectric plate means is arranged parallel to the longitudinal axis of the strain transducer.

15. Strain transducer according to claim 1, characterized by an incorporated miniature amplifier.

16. Strain transducer according to claim 1, characterized in that the piezoelectric plate means includes two piezoelectric plates and an electrode is clamped between the two piezoelectric plates.

17. A piezoelectric strain transducer for determining the elongation of a measuring section on the surface of a test specimen under cyclic loads, the transducer comprising two spaced bearing surfaces for frictionally engaging the measuring surface section of the test specimen, at least one adjustable resilient member being connected to at least one of the bearing surfaces, a support member forming a support surface for at least one piezoelectric plate means being connected to at least the other bearing surface, the piezoelectric plate means being under pre-compression and arranged for responding solely to shearing forces, a force-transmitting member extending from the at least one adjustable resilient member to the piezoelectric plate means for bearing upon the upper surface of the piezoelectric plate means, and a single fastening member extending through the transducer between the two bearing surfaces for frictionally connecting the transducer to the measuring section, whereby upon a change of length of the measuring section of the test specimen, substantially only a shearing force acts on the piezoelectric plate means corresponding to the strain in the measured surface section and resulting in corresponding electrical signals being provided by the piezoelectric plate means.

* * * * *